Figure 7:
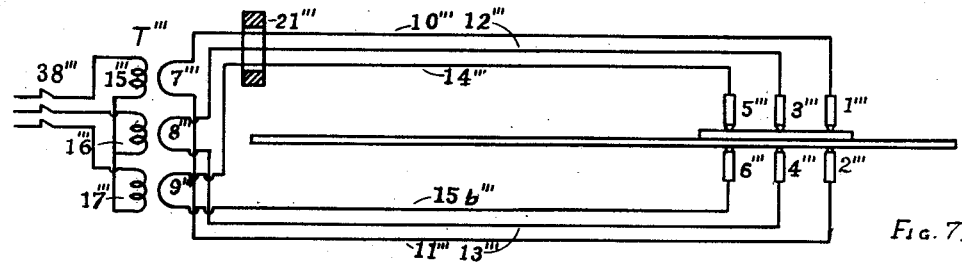

C. H. KICKLIGHTER.
METHOD OF ELECTRIC WELDING.
APPLICATION FILED NOV. 10, 1913.
1,189,582.
Patented July 4, 1916.
2 SHEETS—SHEET 1.
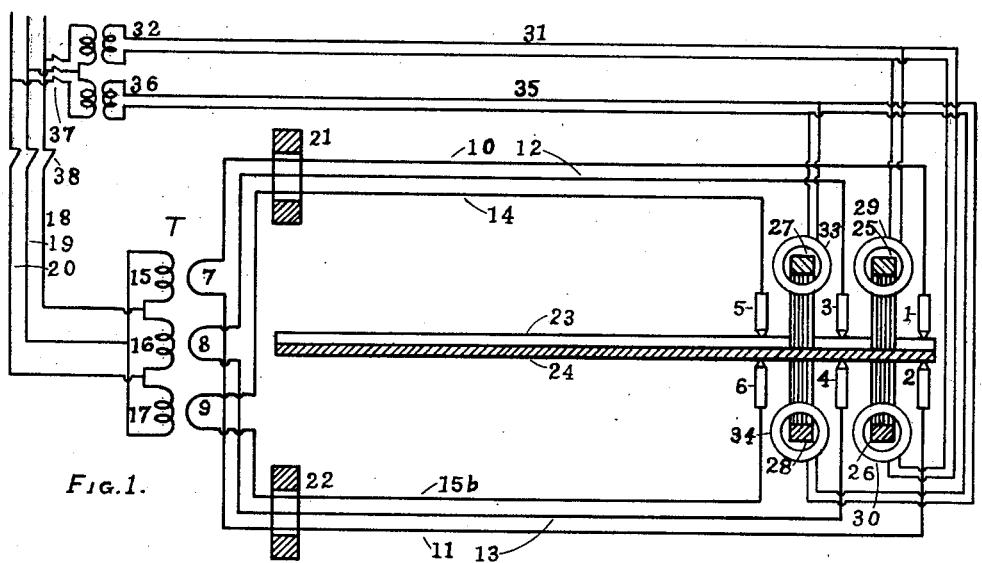
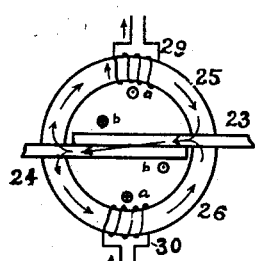
Fig. 2.
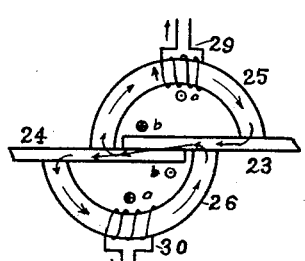
Fig. 3.
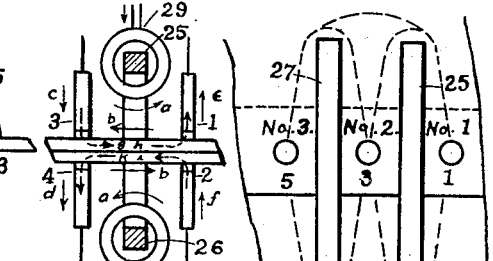
Fig. 4.   Fig. 5.
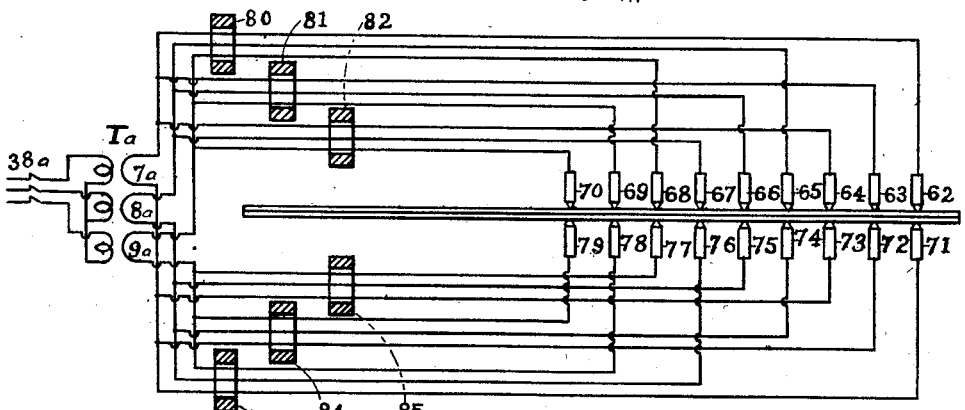
Fig. 6.
WITNESSES:
W A Medlock
E H Stevens
INVENTOR
Charles H. Kicklighter.

UNITED STATES PATENT OFFICE.

CHARLES H. KICKLIGHTER, OF ATLANTA, GEORGIA.

METHOD OF ELECTRIC WELDING.

1,189,582.   Specification of Letters Patent.   Patented July 4, 1916.

Application filed November 10, 1913. Serial No. 800,166.

*To all whom it may concern:*

Be it known that I, CHARLES H. KICKLIGHTER, a citizen of the United States, residing at Atlanta, in the county of Fulton and State of Georgia, have invented new and useful Improvements in the Method of Electric Welding, of which the following is a specification.

This invention relates to the method of and apparatus for electric welding of metal plates into cylinders and other forms. In such operations heretofore single-phase current has been used, and the welding limited to one spot or location. The drawing of heavy single-phase current from a three-phase transmission system is objectionable because, (1) it disturbs and unbalances the whole system, (2) the line loss is greater in using single-phase current, and (3) a heavy load or overload may be thrown on the specific alternator winding, transformer and line wires from which this phase current is drawn. Furthermore by using a plurality of welding points, work of certain natures may be accomplished faster and more economically, and the spot welds distributed with greater uniformity. I employ poly-phase current and am enabled to make a plurality of welds simultaneously, (1) by using an equalizing ring or core to maintain an equality between the welding currents, and (2) by interposing between the welding terminals on either side of the plate a magnetic yoke to prevent any tendency of one welding secondary short circuiting another. This method consists of a plurality of welding circuits, the sums of the currents in which at any instant, taking into consideration their direction and magnitude, would be zero or approximately so. The conductors forming a portion of these circuits are passed around an iron core or through an annular ring. As long as the sum of these currents is zero the iron has no influence, but if the current in one circuit tends to rise above its normal value, the magnetic flux produced in the iron core or ring will tend to decrease said current and to increase the remaining currents. In other words, energy is taken from the said circuit and is transferred by induction to the remaining circuits. If on the other hand the welding current in one circuit tends to become abnormally low, due to a greater contact resistance at the plate, the iron core or ring tends to equalize the welding currents by subtracting energy from the other circuits and adding it to this circuit, in which current below the normal would otherwise pass.

The equalizing ring is of great advantage where one welding circuit is employed with an auxiliary circuit, bearing a current of the same phase but in opposite direction for the purpose of removing self-inductance and eddy currents. It makes little difference whether this auxiliary current be used as another welding current or not, the action is the same. Its primary advantage seems to be, however, in connection with poly-phase circuits, as the commonly known three phase system. It is very desirable in this connection, as this is a commonly accepted system of transmission. The iron core or ring assists in the successful making of three or more good welds simultaneously. By maintaining the load on the several phases approximately equal, the system is not unbalanced by the operation. The line loss and strain on the generating unit or units are also a minimum.

Another object of this invention is to prevent the tendency under certain conditions of one welding secondary becoming a path for short circuiting another welding secondary so that a portion of each welding current does not flow through the plates at the point of weld. The method employed is to produce in the plates between the locations of welds a counter-pressure opposed to the direction in which the leakage tends to occur.

Other objects and advantages of this invention will hereinafter appear, and the novel features thereof will be especially pointed out in the appended claims.

In order that this process and some of the ways in which it can be applied may be clearly understood, reference is made to the accompanying drawings forming a part of this specification, and in which,—

Figure 8:
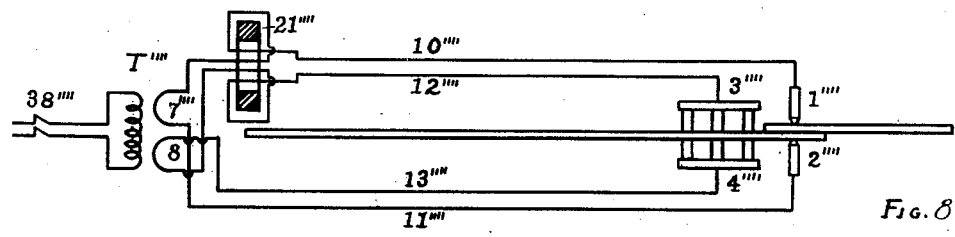
Figure 9:
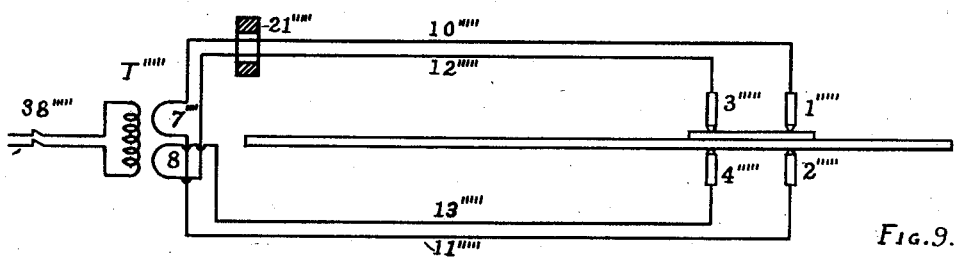

Figure 1 is a sketch illustrating the electrical connection for employing three welding circuits, in connection with a three phase transmission system. This shows in addition the connections and magnetic yokes for preventing welding current from flowing from one welding secondary into another. Fig. 2 is a sketch of a side elevation of magnetic yokes 25 and 26 of Fig. 1, illustrating their operation. Fig. 3 is a modified sketch illustrating the same yokes as in Fig. 2 slid somewhat relative to each other. Fig. 4 is a sketch showing how the counter pressure induced by the flux in the yoke of Figs. 2 and 3 prevents trouble. Fig. 5 illustrates a partial top view looking down upon Fig. 1 and showing the magnetic yokes in position. Fig. 6 is a sketch illustrating the electrical connection for employing a large number of welding circuits, in connection with a three phase supply. Fig. 7 is a sketch illustrating the electrical connections for welding with three phase current, more simplified than in Fig. 1. Fig. 8 is a sketch illustrating the electrical connection and equalizing magnetic core in connection with the employing of one welding circuit with an auxiliary loop. Fig. 9 is a sketch illustrating the electrical connections and equalizing magnetic core in connection with the employing of two oppositely connected welding circuits, for the purpose of removing self-inductance and eddy currents.

Referring to Fig. 1, the welding terminals 1, 2, 3, 4, 5, 6 are connected to the secondaries 7, 8, 9 of a bank T of transformers supplied by the well known three phase system. Terminals 1 and 2 are connected by conductors 10 and 11 to secondary 7. Terminals 3 and 4 are connected by conductors 12 and 13 to secondary 8. Terminals 5 and 6 are connected by conductors 14 and 15$^b$ to secondary 9. The primaries 15, 16, 17 of these transformers are connected delta to the three line supply wires 18, 19, 20. The welding leads 10, 12, 14 pass through an annular ring of iron 21, preferably laminated. The welding leads 11, 13, 15 pass through a similar iron ring 22. These rings are connected as circuits for magnetic flux, the function of which is to equalize the welding current, if there is a tendency to become unequal. A closed magnetic circuit core about which each welding lead was wound several times, would serve the same function. As the secondaries of the welding transformer or transformers are not inter-connected, there is little tendency of one secondary serving as a short circuit to another secondary. However, in making spot welds relatively close together on thick plates, leakage and loss of energy are apt to occur under certain conditions. I bring in contact with the same plates 23, 24 upon which the welding terminals press, semi-circular iron yokes 25, 26, 27 and 28. Yokes 25 and 26 are placed on opposite sides of the plates between the terminals 1—3 and 2—4 of say phases No. 1 and No. 2, respectively. Yokes 27 and 28 are placed on opposite sides of the plates between the terminals 3—5 and 4—6 of say phases No. 2 and No. 3, respectively. Around yokes 25 and 26 are wound coils 29 and 30, connected by leads 31 to the secondary of transformer 32 connected to the supply. Around yokes 27 and 28 are wound coils 33 and 34, connected by leads 35, to the transformer secondary 36 connected to the supply. Switches 37 and 38 connect the exciting transformers and the welding transformers, respectively, to the supply. The function of these yokes is to offer a counter pressure to offset the tendency of the welding current to leak from one welding secondary into another without passing through the metal plates at the points of the desired welds. The operation of these magnetic yokes may be more clearly seen by reference to Figs. 2, 3, 4 and 5, which illustrate the action of yokes 25, 26, 27 and 28 of Fig. 1.

Referring to Figs. 2, 3 and 4, the magnetic yokes are wound with coils 29—30 in such manner that the flux flows as the arrows indicate, with a return path for both circuits through the iron plates. If $a$—$a$ indicate the direction of flow of the core exciting current, the induced counter pressures along the plates should be as indicated at $b$—$b$, which is opposed to the direction of leakage of welding current.

In Fig. 4, $c$—$d$ and $f$—$e$ indicate the directions of flow of the welding currents at any instant in welding terminals 3—4 and 2—1. The path in which there is a tendency of leakage is $c$—$g$—$h$—$e$—secondary 7—$f$—$i$—$k$—$d$—secondary 8 back to $c$. But the leakage paths at $g$—$h$ and $i$—$k$ are prevented by the counter pressure $b$—$b$ exerted by yokes 25 and 26.

Fig. 5 is a partial top view illustrating the yokes of Fig. 1 in position. Any leakage now between terminals 1, 3 and 5, or between terminals 3, 4 and 6 will have to be through the plates around the ends of the yokes as indicated by the dotted lines. The relative resistance of this longer path is such as to reduce the leakage current to a very small quantity.

The operation is simple. Press welding terminals 1—3—5 down upon the joint of the plates opposite, respectively, to welding terminals 2—4—6. Bring the yokes 25, 26, 27 and 28 into their places between the welding terminals as explained. Close switches 38 and 37, welding currents flow from secondaries 7, 8, 9 through the plates between terminals 1—2, 3—4 and 5—6, respectively. The equality of the welding current is maintained by magnetic rings 21 and 22. Leakage of currents is prevented between phases by yokes 25, 26, 27 and 28. The transmission lines 18, 19 and 20 are equally loaded. Three good welds are made simultaneously.

In Fig. 6$^a$ the welding transformer T receives three phase current from the supply, and its three secondaries 7$^a$—8$^a$—9$^a$ deliver currents which are respectively broken up to feed a plurality of welding terminals 62 to 79, inclusive. It will be noticed that on each side of the iron plates the conductors are divided into groups of three each. Each group contains conductors connected each to different welding secondaries, which conductors are also carried through or around an equalizing iron ring or core. The currents linked with any equalizing ring are of different phases and are 120 degrees apart. These equalizing rings are for the purpose of preserving an equality between the individual currents linking with them, as previously explained. Rings 80, 81 and 82 are linked with the welding conductors on one side of the plates and rings 83, 84 and 85 with the welding conductors on the other. The welding circuits to which the conductors, passing through any given ring, belong, are completed, respectively, on the other side of the plate by conductors passing through distinct and separate rings. This is done so that if the current in any one circuit tends to change from a normal value, every other circuit is called upon to contribute toward restoring the equality. To illustrate, suppose that the contact resistance between one of the terminals 66—75 and the plates was abnormally high; the tendency would be for a low current to flow in this circuit, resulting in a poor weld. The conductor connected with terminal 66 passes through ring 81, through which also pass conductors leading to terminals 63 and 69. The conductor connected with terminals 75 on the other side of the plate passes through ring 85, through which also pass conductors leading to terminals 73 and 77. The circuits 63—72, 69—78, 73—64, 77—68, to which the above terminals 63, 69, 73 and 77, respectively belong, must each contribute energy to the defective circuit to restore equality. Not only that, but the conductors of the above circuits, connected to the aforesaid terminals 72—78—64—68 link through the remaining rings 81—83—82—80, respectively. As this involves the remaining circuits, it is evident that energy will be taken from them also by the aforesaid circuits 63—72, 69—78, 73—64, 77—68, which directly link with the defective circuit. It is evident that all the circuits are called upon to contribute toward restoring an equality in the defective circuit. A general equality of welding currents is maintained in all the circuits, thus insuring a plurality of welds simultaneously in one operation.

The operation is apparent. All the welding terminals are pressed against the plate in their respective proper position and switch 38ª is closed. The secondaries 7ª, 8ª, 9ª of the three phase transformer or transformers furnish welding currents which are divided into three circuits each, in this case. The equalizing rings or cores distribute equal magnitudes of currents through a plurality of welding circuits. A plurality of good welds are simultaneously made.

In Fig. 7 is illustrated, in simpler form, the same operation as attained in Fig. 1. The figure is divested of the magnetic yoke for preventing leakage, and of one of the magnetic equalizing rings. Otherwise the connections are the same. A three phase welding transformer T''' furnishes three sets of welding terminals with independent currents at an angular distance of 120 degrees from one another. Equalizing ring 21''' assists in maintaining the equality of these currents.

In Fig. 8 is shown the method by which the magnetic equalizing ring can be used with a simple loop or auxiliary circuit, designed only for preventing self-inductance and eddy currents in the iron plates or shells. Instead of simply passing through the ring the conductors may be wound one or more times through the ring 21'''' as shown. Theoretically the auxiliary loop would be traversed by a current equal and opposite to the welding current in order to neutralize interference from self-inductance and eddy currents. It is difficult to establish and maintain this value under the varying conditions of practice ordinarily, but the use of the equalizing core makes this easy. The operation is apparent. When the welding and auxiliary terminals are pressed in their proper places against the plate and switch 38'''' is closed, the welding current flows with no interference from self-inductance or eddy current, and a good weld is made.

In Fig. 9 is illustrated the use of the equalizing magnetic ring with two equal opposite welding circuits for simultaneous operation. The equality of the welding currents is maintained by the ring and there is no interference from self-inductance or eddy current. The magnetic yokes for preventing leakage may evidently be introduced between the points where the welds are desired, if this is necessary.

What I claim is,—

1. A method of electric welding consisting of conveying by conductors and applying by mechanical pressure at conductor terminals to said metals simultaneously a plurality of currents in different phase relations so that any one or more of these tend to prevent inductance in the metal by the remainder.

2. A method of fastening metals together, consisting of conveying by conductors and applying by mechanical pressure at the conductor terminals to the parts of union a plurality of currents in different phase relations so that any one or more of these tend to prevent inductance in the metal by the remainder.

3. A method of electric welding which consists of conducting around metallic material and applying simultaneously a plurality of alternating currents in different phase relations, and of shielding said metallic material from alternating flux by linking with said currents a common path of magnetic flux.

4. A method of electric welding which consists of conducting around metallic material and applying simultaneously a plurality of alternating welding currents in different phase relations, and of maintaining an equality of said currents by linking with them a path of magnetic flux.

5. A method of electric welding which consists of conducting around metallic material and applying simultaneously three alternating welding currents in three-phase relation, and of shielding said metallic material from alternating flux by linking with said currents a common path of magnetic flux.

6. A method of electric welding which consists of conducting around metallic material and applying simultaneously three alternating welding currents in three-phase relation, and of preserving the equality of said currents by permitting of a mutual transfer of energy among them through a common linking of magnetic flux.

7. A method of electric welding which consists of conducting around metallic material and applying simultaneously three alternating welding currents in three-phase relation, and of linking with said currents an inductive magnetic flux when a given relation among the currents is disturbed and of removing said inductive magnetic flux when a given equilibrium is maintained.

8. A method of electric welding which consists of conducting around metallic material and applying simultaneously three alternating welding currents separated in a three-phase relation by equal time intervals.

9. A method of electric heating which consists of conducting around metallic material and applying simultaneously three alternating heating currents separated in a three-phase relation by equal time intervals.

10. A method of electric welding which consists of conducting around metallic material and applying simultaneously three alternating welding currents in three-phase relation, and of holding the phase currents apart by passing magnetic flux between them.

11. A method of electric welding which consists of conducting around metallic material and applying simultaneously three alternating welding currents in three-phase relation, and of preventing an exchange of currents between and among the phases by opposing with the passage of magnetic flux.

12. A method of electric welding which consists of conducting and applying simultaneously a plurality of alternating currents in different phase relation, and of holding the phase currents apart by passing magnetic flux between them.

13. A method of electric welding which consists of conducting and applying simultaneously a plurality of alternating currents in different phase relation, and of preventing an exchange of currents between and among the phases by opposing with the passage of magnetic flux.

In testimony whereof, I have hereunto signed my name in the presence of two subscribing witnesses at Atlanta, in the county of Fulton and State of Georgia, this 7th day of November, 1913.

CHARLES H. KICKLIGHTER.

Witnesses:
E. H. STEVENS,
W. A. MEDLOCK.